June 18, 1946.   H. L. TRAUTMANN   2,402,353
STOP DEVICE
Filed May 25, 1943

HERBERT L. TRAUTMANN,
INVENTOR

BY
ATTORNEY.

Patented June 18, 1946

2,402,353

UNITED STATES PATENT OFFICE 2,402,353

STOP DEVICE

Herbert L. Trautmann, Los Angeles, Calif., assignor to Zephyr Manufacturing Co., Inglewood, Calif., a copartnership composed of D. L. Dotson, H. L. Trautmann, and Jay Harkey Application May 25, 1943, Serial No. 488,421

2 Claims. (Cl. 77—73.5)

My invention relates to a tool and has particular reference to a micrometer stop device finding particular utility when employed with countersinks, end mills and like cutting tools.

In the manufacture of various types of mechanisms and devices it is often necessary to countersink previously drilled holes, as for example, to accommodate the heads of flat head screws or to counterbore enlargements in previously drilled holes, as for example, to accommodate the heads of shoulder screws, stop pins and similar machine elements. In this character of machine operation, it is highly desirable that the depth to which the countersinking or counterboring operation is carried be controlled within precise limits so that, for example, the protruding portion of a shoulder screw may bear a fixed relation to the part to which it is secured or, for example, so that the head of a flat head screw may fit down precisely flush with the surface into which the countersink is formed.

Prior to my invention it has been the practice to use stop mechanisms associated with countersinking or counterboring tools, these mechanisms being arranged to engage the surface of the workpiece and arrest the longitudinal movement of the cutting tool when the cutting operation has been carried to the desired depth.

The prior devices have not been entirely satisfactory for the reason that they do not provide a ready means of adjusting the depth to which the cutting operation will be carried before the stop arrests the movement of the cutting tool.

It is therefore an object of my invention to provide a stop device for use with countersinks, boring tools and like cutters, which overcomes the above noted disadvantages of being readily and accurately adjustable without the use of tightening tools to provide for variable amounts of cutting movement of the tool before the stop device arrests the operation of the tool.

It is additionally an object of my invention to provide a stop of the character set forth in the preceding paragraph, which is rotatably mounted on the cutting tool so that the same may be held stationary in the hand while the tool rotates with respect to the stop to permit the tool to be guided by hand into the opening to be countersunk or counterbored.

It is a still further object of my invention to provide a stop of the character hereinbefore referred to, which employs a minimum number of simply constructed parts to reduce to a minimum the cost of manufacturing the stop and to reduce maintenance and operating costs to a minimum.

It is also an object of my invention to provide a stop of the character set forth in the preceding paragraphs which employs a novel adjusting mechanism for adjusting the relation between the stop and the cutting tool.

Other objects and advantages of my invention will be apparent from a study of the following specifications, read in connection with the accompanying drawing, wherein.

Figures 1, 2, 3:
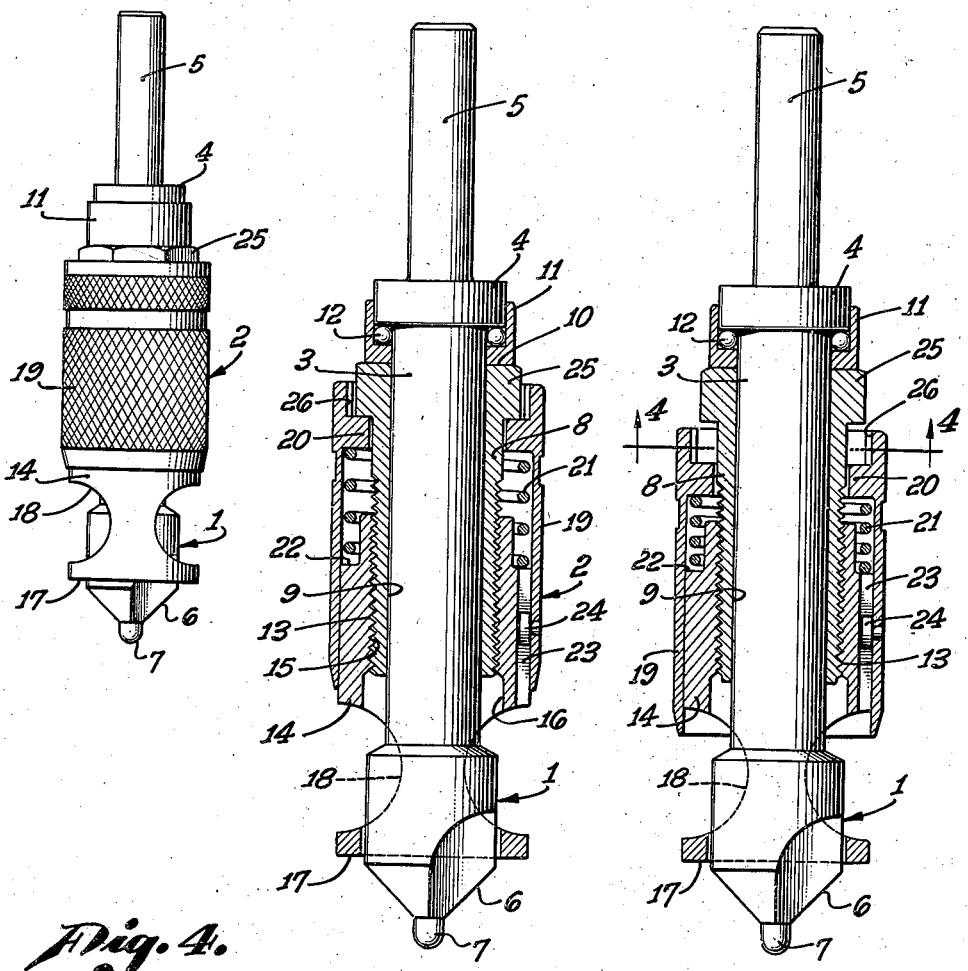
Fig. 1 is an elevational view of the preferred embodiment of my invention as applied to a countersinking tool.
Fig. 2 is a longitudinal sectional view of the device shown in Fig. 1 and illustrating the relative positions of the parts when the device is ready for use.
Fig. 3 is a view similar to Fig. 2 but illustrating the manner in which the adjusting device is manipulated in order to change the location of the stop relative to the cutting tool.

Referring to the drawing, I have illustrated in Fig. 1 the preferred embodiment of my invention as comprising a countersinking tool 1 which is surrounded by a stop member 2. The countersinking element 1 is formed on a shaft 3 which is radially enlarged as indicated at 4 and connected to a stem or shank 5 adapted to be received and clamped within the chuck of an electric drill or similar power tool.

The countersinking element 1 is provided with cutting edges 6 arranged in the conventional manner and carries a pilot 7 adapted to enter the hole which is to be countersunk and which serves to guide and center the tool during operation.

The stop mechanism 2 includes a bearing sleeve 8 which is bored as indicated at 9 to rotatably receive the shaft 3. The upper end of the sleeve 8 defines a radially disposed face 10 upon which is rested a ball retainer 11. The ball retainer 11, together with the enlargement 4 and balls 12 comprises a thrust bearing by means of which axial loads on the sleeve 8 may be transmitted to the shaft 3 and shank 5.

The outer surface of the sleeve 8 is threaded as indicated at 13 to permit attachment thereto of a stop member 14. The member 14 preferably comprises a cylindrical sleeve which is internally threaded as at 15 to cooperate with the threads 13 and which is counterbored as indicated at 16 to receive the cutting tool or countersink 1. The stop member 14 terminates in a lower plane face 17 which is disposed at right angles to the axis of the shaft 3 and which is adapted to bear against the surface of the workpiece being cut and arrest downward movement of the countersink 1. The stop member 14 is preferably cut away at one or more places as indicated at 18 to provide apertures through which chips and cuttings may be discharged.

With this construction it will be noted that the stop member 14 may be held against rotation as, for example, by hand while the shaft 3 and countersink 1 may be rotated. This permits the stop device 2 to be held in the hand for the purpose of guiding the pilot 7 into the hole to be countersunk or counterbored while the cutting tool is being rotated. It will also be noted that as the tool advances during the cutting operation, the stop face 17 will advance toward the workpiece. When the stop face 17 engages the workpiece, further feeding movement of the tool is arrested by virtue of the thrust connection between the sleeve 8 and the shaft 3 afforded by the ball bearings 12.

The depth to which the countersinking operation is carried is controlled by the position of the stop member 14 relative to the sleeve 8, this position being adjustable through the threaded engagement 13—15 upon rotation of the member 14 relative to the sleeve 8.

To permit such adjusting movement of the parts 8 and 14 and to permit locking these parts against movement once the desired adjustment has been attained, I provide a stop lock member 19 which preferably comprises a cylindrical sleeve overlying the member 14 and including an inwardly extending radial flange 20. A compression spring 21 is interposed between the flange 20 and an outwardly projecting radial flange 22 provided on the exterior of the member 14, the spring 21 thus serving to urge the stop lock member 19 upwardly with respect to the member 14. The stop lock member 19 is non-rotatably keyed to the member 14 for axial sliding movement relative thereto as by providing in the member 14 an axial keyway 23 adapted to receive a key or pin 24 carried by the stop lock member 19.

Figure 4:
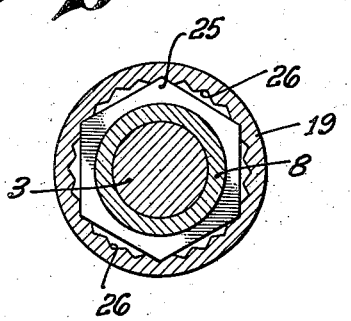
Fig. 4 is a cross sectional view taken substantially along the line IV—IV of Fig. 3.

The upper end of the sleeve 8 identified by the reference character 25 is preferably provided with a hexagonal cross section as is indicated in Fig. 4. This hexagonal cross section is normally received within a portion of the interior of the stop lock member 19 which is disposed above the flange 20, this portion being provided with a plurality of short axially extending V-shaped grooves 26 each of which preferably has an angle of 120° so that the corners of the hexagonal portion 25 may be received within the grooves in the manner shown in Fig. 4.

This inter-engagement between the hexagonal portion 25 and the stop lock sleeve 19 serves to hold the member 14 against rotation relative to the sleeve 8. By sliding the member 19 downwardly against the force of the compression spring 29 to a point such as that illustrated in Fig. 3, the stop lock member 19 may be disengaged from the head 25 of the sleeve 8 whereupon the stop lock member 19 may be rotated to thereby rotate the stop member 14 through the interconnection afforded by the key 24 and the keyway 23. As previously stated, this rotation of the member 14 serves to adjust its position relative to the cutting element 1. When the desired adjustment is obtained the stop lock member 19 is released and the spring 21 returns the same to the upper position which is illustrated in Fig. 2, again engaging the corners of the hexagonal member 25 with the V-shaped grooves 26 to hold the member 14 against rotation relative to the sleeve 8.

From the foregoing it will be observed that I have provided a novel stop mechanism for countersinks, boring tools and like devices which is susceptible to ready and accurate adjustment to control the depth to which the countersinking or counterboring operation will be carried.

It will also be noted that in the form of the invention shown, the outer parts of the device including the stop member itself are rotatably mounted upon the cutting tool so that these outer parts may be held in the hand while the tool is operating, thereby assisting in the guiding of the tool by hand into the bore to be countersunk or counterbored.

While I have described the preferred embodiment of my invention as adapted to a countersinking tool, it is to be realized that the same may be used with equal facility with counterbores, reamers and cutting tools of like character in those cases where it is desired to limit the distance the tool is fed axially.

While I have shown and described the preferred embodiment of my invention, I do not desire to be limited to any of the details of construction shown or described herein, except as defined in the appended claims.

I claim:

1. In a stop device for limiting the axial movement of a rotating cutting tool, the combination of: a shank on said tool defining a thrust shoulder; a thrust sleeve surrounding said shank between said shoulder and said tool, said sleeve being mounted on said shank for rotation relative thereto and including a lock portion having a regular polygonal cross section; a thrust bearing interposed between said sleeve and said shoulder; a stop member surrounding said sleeve, said stop member being threadedly connected to said sleeve; a lock sleeve surrounding said thrust sleeve and including an end portion surrounding said lock portion, said end portion having formed in the inner surface a plurality of uniformly spaced grooves for receiving the corners of said polygonal cross section, the number of said grooves being a whole number multiple greater than one of the number of sides of said polygonal cross section; and means mounting said lock sleeve on said thrust sleeve for non-rotatable sliding movement relative thereto from one position in which said corners are received in said grooves to another position in which said corners are free of and spaced from said grooves.

2. In a stop device for limiting the axial movement of a rotating cutting tool, the combination of: a shank on said tool defining a thrust shoulder; a thrust sleeve surrounding said shank between said shoulder and said tool, said sleeve being mounted on said shank for rotation relative thereto and including a lock portion having a regular polygonal cross section; a thrust bearing interposed between said sleeve and said shoulder; a stop member surrounding said sleeve, said stop member being threadedly connected to said sleeve; a lock sleeve surrounding said thrust sleeve and including an end portion surrounding said lock portion, said end portion having formed in the inner surface a plurality of uniformly spaced grooves for receiving the corners of said polygonal cross section, the number of said grooves being a whole number multiple greater than one of the number of sides of said polygonal cross section; means mounting said lock sleeve on said thrust sleeve for non-rotatable sliding movement relative thereto from one position in which said corners are received in said grooves to another position in which said corners are free of and spaced from said grooves; and spring means interposed between said stop sleeve and said thrust sleeve for urging said thrust sleeve toward said one position.

HERBERT L. TRAUTMANN.